Patented Nov. 24, 1931

1,833,384

UNITED STATES PATENT OFFICE

RYUZO TORIKATA, OF OSAKA, JAPAN

PREPARATION OF SPECIFIC ANTIGEN COCTOIMMUNOGEN

No Drawing.   Application filed July 29, 1922. Serial No. 578,497.

The present invention relates to a preparation of specific antigens which are free or nearly free from secondary reactions. The method of preparing the antigens is as follows:—Either the pure culture of the bacterium of human or animal pathological tissues that have been naturally or artificially infected by pathogenic micro-organisms whose pure cultures are unknown are made into a physiological saline emulsion and is then exposed to Roentgen rays, ultraviolet rays or to boiling heat at 100° C. for thirty minutes. The suspension is then either filtered, using the Berkefeld filter, or directly desiccated by well known methods. The material thus obtained contains either liquid or desiccated antigen, which is employed for the prophylactic or therapeutic purpose. The object of the preparation is to overcome various defects in vaccines previously known and to obtain a vaccine which may serve for the above mentioned purposes not only by injection, but by being administered per os.

For convenience, the present invention may be explained by dividing it into three parts as follows:

Article I.—The principles of the present invention are based upon the following facts which have been established by experiment and scientific investigation. In the pure culture of any bacterium or in the hitherto known vaccines, there is a serological substance which interrupts the mutual action of the antigen with the antiserum. This substance has been proved to be destroyed by exposing the culture of the vaccine to Roentgen rays, ultra violet rays or boiling heat at 100° C. The inventor has named this substance "Impedin". The time required for the complete destruction of the Impedin differs with the different species of the bacteria and is decided by quantitative determination of the maximum production of sedimentation by precipitation reactions with the antigen and the corresponding antiserum. The quantitative determination is conveniently made by means of the precipitometer, which the present inventor has invented. The antigen is freed from the bacterial bodies and the freed antigen is dissolved into the liquid by heating. The immunizing property is practically absent in the residue of the boiled bacterial bodies after the extraction of the soluble antigen, but is present in the filtrate of the boiled bacterial culture. The number of the bacterial bodies does not constitute any ground on which the efficacy of the antigen can be estimated. However, with the filtrates of the boiled emulsion, the efficacy of immunization may be estimated by the quantity of the sedimentation that is produced by the precipitating reaction. The amount of the precipitate may give an indication of the strength of the antigen, or in other words, the effects of the precipitinogen and the antigen are proportional or parallel to each other.

Vaccines heretofore known have various objectionable secondary effects, for example, pyrexia reacts to produce a local swelling and pain at the place of injection, etc., but the boiled antigen freed from the residue of the micro-organisms does not give any noticeable secondary effect.

The method of the invention will be explained more minutely by the preparation of, for example, typhoid antigen. A twenty-four-twenty eight hour old culture of *Bacillus typhosus* is cultivated on a solid medium of common agar and is suspended in physiological salt solution in the proportion of 2 mg. to 1 c. c. The suspension is, for instance, divided into five equal parts, and the parts I–IV are heated at 100° C. for 20, 30, 40 and 60 minutes respectively, and while the part V remains unheated, each part is then sterilely filtered through a porcelain filter. Each filtrate is then mixed with the same quantity of typhoid immune serum, and the quantity of the precipitation is estimated by means of the precipitometer. If the mixture of the immune serum and the sterile filtrate of the suspension that had been heated for one-half hour should give the maximum quantity of the precipitate, the Impedin produced by the given strain of *Bacillus typhosus* has been completely destroyed by boiling for one-half hour. The cultures of the strain are then collected and heated at 100° C. for one-half hour and the sedimentation removed either by filtration through the porcelain filter or by other routine methods. The clear filtrate is hermetically sealed and thus the preparation of the antigen is completed.

It has been found that either Roentgen rays or ultra violet rays give about the same results as the application of heat in the destruction of Impedin, but for practical purposes the boiling of the aqueous suspension is the simplest method of preparation.

The immunization value of the boiled antigen, as it is prepared after the above mentioned method, is not expressed by the number of the bacteria as is made in the hitherto known vaccines, but by the total quantity of the precipitate produced in a mixture of equal volumes of the antigen and of standard immune serum.

*Article II.*—This method facilitates the preparation of the antigen with a certain species of the pathogenic micro-organisms with which the coctoimmunogen cannot be prepared by the method stated in the Article I, or with a species of the pathogenic micro-organisms with which the pure culture has not been able to be produced. Or in other words, the present method described in this article has the characteristic to facilitate the preparation of the antigen, by exposing to the boiling heat at 100° C., Roentgen rays or ultraviolet rays the emulsion of the animal tissues that was obtained from the animals infected with the pure culture of the pathogenic micro-organisms or the naturally infected human or animal pathological tissues, from which the pathogenic micro-organisms can not yet be cultivated. The method of the preparation is explained by the following two or three instances.

The viscera of the animal that has been infected by typhus fever, e. g., the spleen, has been proved to contain a great deal of the antigen. Therefore, a physiological saline emulsion is prepared with the infected spleen, and heated at 100° C. for one half hour and then entirely freed from any insoluble substances by means of centrifugation and filtration. The so obtained transparent fluid is hermetically sealed in glass bottles. This is called the specific boiled antigen, or non-bacterial vaccine, or coctoimmunogen of typhus fever. This completes the entire process of the preparation.

Another instance:—A physiological saline emulsion is prepared with the lymph collected from the 7–8 day old ripe vaccinia of either naturally or artificially infected cow in proportion of 1.0 g. : 5.0 c. c. The emulsion is then boiled in the water bath for one half hour to one hour and centrifugalized. The supernatant fluid is the specific antigen, which is filled in glass tubes and hermetically sealed. This completes the preparation of the vaccinia cocto antigen.

Thus the present invention may be applied to the preparation of antigens with various invisible pathogenic micro-organisms such as the virus of vaccinia, hydrophobia and cattle plague, or those that are very difficult to obtain the pure culture such as *Spirocheta pallidum* and *Bacillus lepræ*. The specific antigens with these micro-organisms may be prepared by the method stated in the preceding paragraphs and also by the application of the action of Roentgen rays or ultraviolet rays.

The antigen consisting of the boiled extract of the viscera infected with the bacteria that can be purely cultivated on the artificial medium has a stronger specific antigenic property than the vaccine consisting of the bacterial emulsion. Therefore, a strong antigen may be obtained even with the pathogenic micro-organisms that are liable to be attenuated in consequence of the cultivation for several generations by boiling the emulsion of the viscera artificially infected with the pure culture of such attenuated germ.

*Article III.*—All the hitherto known vaccines, which are used either for prophylactic or therapeutic purposes, consist of nothing but a suspension of antigenic bacteria, and are employed exclusively by injection. The injection is, however, not absolutely necessary for the administration of antigens, because all the infectious diseases, which are related with the digestive tracts such as cholera, typhoid fever, dysentery, etc., may be prophylactically controlled by the local immunization that is bestowed on the tracts by the administration of the antigen per os.

In order to employ the suspension of the antigenic bacteria as all of the hitherto known vaccines are formed, for the internal administration, there are met with not only various inconveniences in their transportation and uses, but also the deterioration of the vaccines themselves by being kept for a long time. These facts make them unfit for their preservation. The present article deals with the method of preparing the desiccated antigen, which has been originated by the present inventor.

The minute description of the method is given below: For instance, in the preparation of the desiccated cholera antigen, the pure culture of *Vibrio choleræ* is exposed to the boiling heat at 100° C., Roentgen rays or ultraviolet rays, just after the same manner as has been described in Articles I and II. The specific antigen of *Vibrio choleræ*, consisting of the residue of the bacterial bodies, is mixed with an appropriate ingredient such as magnesia usta in proportion of a certain quantity of the boiled specific antigen just equal to the antigenic strength as 0.2 milligram of the bacteria per 0.1 gram of the mixture. The mixture is then desiccated into powder, and it is bottled in the form of powder, pills or tablets, each piece of the latter two being made to contain 0.1 gram of the antigen. This completes the preparation of the desiccated antigen.

This invention is based on the principle which the inventor advocates that the purpose of the prophylactic treatment of an infectious disease of the digestive tracts is most rationally to be effected by bestowing immunization on the canal itself instead of injecting the vaccine hypodermically as hitherto has been used in practice. As there is no need of apprehension as to the by-effects such as pyrexia, local swelling or pain, etc., the antigen for the purpose of the intestinal administration per os. can be practically made into powder immediately after the bacterial emulsion has been exposed to heat, Roentgen rays or ultraviolet rays without clearing of the bacterial residues, as has been stated in the preceding paragraphs.

The desiccated antigens of *Bacillus typhosus*, *Coli communis paratyphosus*, *Bacillus dysenteriæ*, etc. may be obtained by applying the same method as stated above, only the difference being that *Vibro choleræ* is replaced by any one of these bacteria.

Having now described my invention, what I claim is:—

1. The method of preparing an antigen from a bacterial substance having inherently a tendency to impede the action of the antigen which includes the acts of providing a suspension of such bacterial substance and subjecting such suspension to the action of an agent capable of preventing such inherent tendency, and thereby facilitate the action of antibodies, complements and leucocytes, the bacterial substance being of a kind that responds to said action of said agent.

2. The method of preparing an antigen from a bacterial substance having inherently a tendency to impede the action of the antigen which includes the acts of providing a culture of bacteria that normally contains a substance inherently tending to impede the action of the antigen and boiling said culture under temperature and time conditions until said impeding substance is destroyed and thereby to facilitate the action of antibodies, complements and leucocytes, the bacteria of the culture being of a kind that responds to such treatment.

3. The method of preparing an antigen from a bacterial substance having inherently a tendency to impede the action of the antigen which includes the acts of providing a physiological saline emulsion of animal pathological tissue, which contains a substance that tends to impede the action of the antigen and subjecting said emulsion to the action of an agent capable of destroying said impeding substance and thereby facilitate the action of antibodies, complements and leucocytes, said tissue being of a kind that responds to said treatment.

4. A method as in claim 3 in which the boiling temperature of the emulsion is 100° C.

In testimony whereof I affix my signature.

Dr. R. TORIKATA.